United States Patent
Nyström et al.

(12) 
(10) Patent No.: US 8,751,804 B1
(45) Date of Patent: Jun. 10, 2014

(54) CONTROLLING ACCESS TO DATA WITHIN ENCRYPTED COPIES OF FILES USING SALT PARAMETERS

(75) Inventors: Magnus Nyström, Sammamish, WA (US); Alina Oprea, Waltham, MA (US); Adam Back, Sliema (MT)

(73) Assignee: DECHO Corporation, Pleasant Grove, UT (US)

( * ) Notice: Subject to any disclaimer, the term of this patent is extended or adjusted under 35 U.S.C. 154(b) by 109 days.

(21) Appl. No.: 13/173,448

(22) Filed: Jun. 30, 2011

(51) Int. Cl.
*H04L 29/06* (2006.01)

(52) U.S. Cl.
USPC ........................................................ 713/168

(58) Field of Classification Search
USPC .................................................. 713/189, 168
See application file for complete search history.

(56) References Cited

U.S. PATENT DOCUMENTS

| 6,134,660 | A | 10/2000 | Boneh et al. |
| 7,965,843 | B1 * | 6/2011 | Maino et al. .................. 380/256 |
| 8,412,934 | B2 | 4/2013 | De Atley et al. |
| 2004/0039911 | A1 * | 2/2004 | Oka et al. ...................... 713/175 |
| 2007/0189540 | A1 * | 8/2007 | Tarkkala ........................ 380/277 |
| 2011/0219438 | A1 * | 9/2011 | Maino et al. ...................... 726/6 |
| 2011/0252243 | A1 * | 10/2011 | Brouwer et al. .............. 713/189 |

* cited by examiner

*Primary Examiner* — Michael S McNally
(74) *Attorney, Agent, or Firm* — BainwoodHuang

(57) ABSTRACT

A technique controls access to a file. The technique involves creating a file encryption key based on (i) a user input parameter (e.g., a user password) from a user of the client device and (ii) an automatically generated salt parameter (e.g., a random number). The technique further involves encrypting the file using the file encryption key to form an encrypted copy of the file, and providing the salt parameter to an external storage system to externally store the salt parameter. Access to data within the encrypted copy of the file requires the salt parameter provided to the external storage system.

15 Claims, 6 Drawing Sheets

CONTROLLING ACCESS TO DATA WITHIN ENCRYPTED COPIES OF FILES USING SALT PARAMETERS

BACKGROUND

It is common for client computers to backup locally stored electronic files to remote backup systems. If a client computer loses electronic files that were backed up to a remote backup system, the client computer is able to recover the electronic files from the remote backup system.

In some conventional remote backup operations, client computers encrypt electronic files and provide only encrypted copies of the electronic files to the remote backup systems for security. In some situations, the encryption keys which are used to encrypt the electronic files are maintained only at the client computers. In other situations, the encryption keys which are used to encrypt the electronic files are sent by the client computers to the remote backup systems perhaps with the client computers temporarily caching the encryption keys during times of use.

If a user of a client computer wishes to delete electronic files from a remote backup system, the user sends a delete command to the remote backup system. One conventional approach to processing such a delete command is for the remote backup system to delete the actual electronic files from the remote backup system in response to the delete command. In a situation where a remote backup system stores (i) encrypted copies of the electronic files and (ii) the encryption keys used to create the encrypted copies, another conventional approach to processing the delete command is for the remote backup system to simply delete the particular encryption key used to create the encrypted copies from the remote backup system in response to the delete command.

SUMMARY

Unfortunately, there are deficiencies to the above-described conventional approaches to processing a delete command. For example, in the conventional approach which deletes the actual electronic files from the remote backup system in response to a delete command, complete deletion of the actual electronic files may take a substantial amount of time. This amount of time to delete the actual electronic files may be on the order of days, e.g., if the remote backup system backs up electronic files by routinely splitting the electronic files into fragments and distributing the fragments across several disks.

Additionally, in the conventional approach which deletes an encryption key from the remote backup system in response to a delete command, the same encryption key may have been used to encrypt electronic files from multiple client computers or multiple electronic files from a single client computer. In these situations, the encryption key cannot simply be deleted from the remote backup system in order to delete an encrypted copy of a particular electronic file backed up on the remote backup system. Rather, if that encryption key is deleted from the remote backup system, the ability to decrypt encrypted copies of other electronic files that are backed up on the remote backup system will be lost as well.

Furthermore, the conventional approach which deletes encryption keys from the remote backup system in response to delete commands is of no help when the encryption keys are maintained only at the client computers. That is, since keys are not stored in the remote backup system, the conventional encryption key deletion approach cannot be used to erase encrypted copies of electronic files from a remote backup system.

In contrast to the above-described conventional approaches to processing a delete command, improved techniques are directed to controlling access to a file via use of a salt parameter. Such techniques involve creating a file encryption key based on a user input parameter (e.g., a user password) and the salt parameter (e.g., a random number), and generating an encrypted copy of the file using the file encryption key. Accordingly, access to data within the encrypted copy of the file needs the file encryption key and thus requires the salt parameter to create the file encryption key. In the context of a backup assembly which backs up the encrypted copy of the file and stores the file encryption key, erasure of the encrypted copy of the file can therefore be effectuated quickly and simply via deletion of the salt parameter. Additionally, when different salt parameters are used to create different keys on a "per file" basis, such techniques provide the ability to erase individual files by deleting individual salt parameters used to create file encryption keys uniquely corresponding to the individual files. Furthermore, such techniques enable storage of the encryption keys to take place either at a client device (i.e., "secure mode") or on an external storage system (i.e., "escrow mode") while the salt parameters for the encryption keys reside on the external storage system.

One embodiment is directed to a method, which is performed in a client device, for controlling access to a file. The method includes creating a file encryption key based on (i) a user input parameter from a user of the client device and (ii) an automatically generated salt parameter. The method further includes encrypting the file using the file encryption key to form an encrypted copy of the file, and providing the salt parameter to an external storage system to externally store the salt parameter. Access to data within the encrypted copy of the file requires the salt parameter provided to the external storage system.

Another embodiment is directed to a method, which is performed in a storage system, for controlling access to a file. The method includes obtaining a salt parameter from an external client device after the external client device creates a file encryption key based on (i) a user input parameter from a user of the external client device and (ii) the salt parameter and after the external client device encrypts the file using the file encryption key to form an encrypted copy of the file. The method further includes storing the salt parameter within the storage system, and providing a response message to the external client device informing the external client device that the salt parameter is stored within the storage system. Access to data within the encrypted copy of the file requires the salt parameter.

Other embodiments are directed to electronic systems, data storage assemblies, disk arrays, electronic client and server devices, computer program products, and so on. Some embodiments are directed to various processes, electronic components and circuits which are involved in controlling access to files using salt parameters.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are

DETAILED DESCRIPTION

An improved technique is directed to controlling access to a file using a salt parameter. Such a technique involves creating a file encryption key based on a user input parameter (e.g., a user password) and the salt parameter (e.g., a random number), and generating an encrypted copy of the file using the file encryption key. Accordingly, access to data within the encrypted copy of the file requires the file encryption key and thus further requires the salt parameter to create the file encryption key.

In the context of a backup assembly which backs up the encrypted copy of the file and stores the file encryption key, erasure of the encrypted copy of the file can therefore be effectuated by simple deletion of the salt parameter, i.e., deletion of the salt parameter removes the ability to recreate the file encryption key. Additionally, when different salt parameters are used to create different encryption keys on a "per file" basis, such a technique provides the ability to erase individual files by deleting individual salt parameters used to create file encryption keys uniquely corresponding to the individual files. Furthermore, such a technique enables storage of the encryption keys to take place either at a client device (i.e., "secure mode" where users assume responsibility to maintain the user password) or on an external storage system (i.e., "escrow mode" where users allow an encryption key derived from the user password to be stored on by the external storage system) while the salt parameters for the encryption keys reside on the external storage system.

Figure 1:
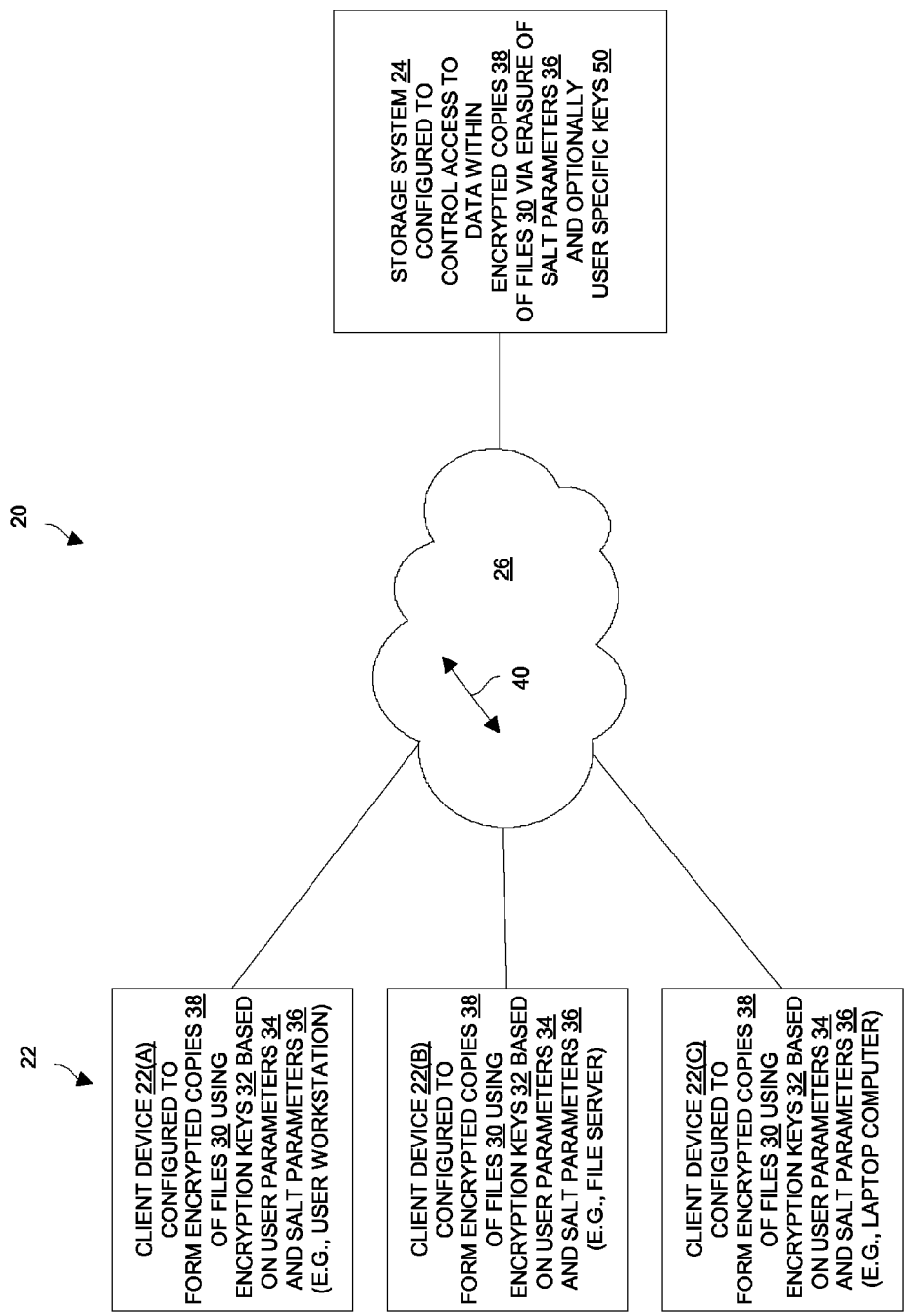
FIG. 1 is a block diagram of an electronic environment which controls access to data within encrypted copies of files via salt parameters.

FIG. 1 shows an electronic environment 20 which controls access to data within encrypted copies of files via salt parameters. The electronic environment 20 includes client devices 22(A), 22(B), 22(C), . . . (collectively, client devices 22), a storage system 24, and a communications medium 26.

Each client device 22 is operated by a user and is constructed and arranged to enable the user to locally store and delete electronic files 30 over time. Additionally, each client device 22 encrypts the electronic files 30 using file encryption keys 32 based on user input parameters 34 and salt parameters 36 to form encrypted copies 38 of the files 30, and stores the salt parameters 36 on the storage system 24. In some arrangements, the client devices 22 backup the encrypted copies 38 of the files 30 on the storage system 24 as well.

The storage system 24 is constructed and arranged to control access to the data within the encrypted copies 38 of the files 30 by maintaining the salt parameters 36. In some arrangements, the storage system 24 is further constructed and arranged to backup encrypted copies 38 of the files 30 which are locally stored on the client devices 22 (i.e., the storage system 24 operates as a backup server).

The communications medium 26 connects the various electronic components of the electronic environment 20 together to enable the electronic components to exchange electronic communications 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based devices and cabling, fiber optic devices and cabling, wireless devices, combinations thereof, and so on. Moreover, some portions of the communications medium 26 may include a computer network (e.g., the Internet, a LAN, a VPN, etc.) while other portions may include a different type of network (e.g., SAN hardware, etc.).

Further details will now be provided in the context of a backup system example. In this example, the storage system 24 not only stores the salt parameters 36 used by the client devices 22 to create the file encryption keys 32, but also backs up the encrypted copies 38 of the files 30. Accordingly, when a file 30 is lost on a client device 22 (e.g., the file 30 is mistakenly deleted, corrupted, etc.), the file 30 can be recovered by decrypting the encrypted copy 38 of the file 30 which is backed up by the storage system 24.

It should be understood that the client devices 22 are capable of taking a variety of different forms. Along these lines, in the context of the backup system example, FIG. 1 shows the client device 22(1) as a user workstation or a general purpose computer, the client device 22(2) as a file server or a network appliance, and the client device 22(3) as a laptop computer or other portable computerized device. It should be understood that computerized devices such as file servers and network appliances are nevertheless operated by users (e.g., they are configured by an administrator, they store information on behalf of end users, etc.) and such devices are clients with respect to the storage system 24 operating as a backup server. Other arrangements are possible as well.

During operation, users of the client devices 22 create files 30 and the client devices 22 then backup encrypted copies 38 of the files 30 on the storage system 24. Such backup operations may be performed manually by the users and/or automatically by the client devices 22 in accordance with a predefined schedule.

To backup an encrypted copy 38 of a newly created file 30, a client device 22 first creates a file encryption key 32. The client device 32 generates the file encryption key 32 based on a user input parameter 34 (e.g., a user password) and an automatically generated salt parameter 36 (e.g., a random number). Optionally, the client device 22 is capable of deriving the file encryption key 32 from one or more additional parameters. For example, in some arrangements, the file encryption key 32 is a function of a user password (i.e., a user input parameter 34), an automatically generated random value (i.e., a salt parameter 36) and a file pathname (i.e., to bind the file encryption key 32 to the file 30).

With the newly created file encryption key 32 now available, the client device 22 generates an encrypted copy 38 of the file 30 using the file encryption key 32. The client device 22 then sends the encrypted copy 38 of the file 30 and the salt parameter 36 to the storage system 24 through the communications medium 26. The storage system 24 then safely stores the encrypted copy 38 of the file 30 and the salt parameter 36 for possible retrieval at a later time.

It should be understood that the client device 22 does not need to send the file encryption key 32 to the storage system 24. Rather, encryption and decryption occur on the client device 22 thus enabling the client device 22 to maintain security over data within the file 30.

It should be further understood that the client device 22 may locally cache the file encryption key 32 after the client device 22 sends the encrypted copy 38 of the file 30 and the salt parameter 36 to the storage system 24. Such operation enables the client device 22 to maintain the ability to decrypt the encrypted copy 38 of the file 30 without further communicating with the storage system 24 to retrieve the salt parameter 36.

However, if the encrypted copy 38 of the file 30 is ever lost (e.g., due to file corruption, accidental file deletion, etc.), the client device 22 is able to retrieve the encrypted copy 38 of the file 30 as well as the salt parameter 36 from the storage system 24 through the communications medium 26. The client device 22 is then able to recreate the file encryption key 32 and decrypt the encrypted copy 38 of the file 30 to access the data.

At this point, it should be understood that there is a 1-to-1 correspondence between file encryption keys 32 and encrypted copies 38 of files 30. Likewise, there is a 1-to-1 correspondence between salt parameters 36, which are used to create the file encryption keys 32, and the encrypted copies 38 of the files 30. Accordingly, to erase the encrypted copy 38 of a particular file 30, the storage system 24 simply deletes the salt parameter 36. Such deletion removes from the electronic environment 20 the ability to recreate the file encryption key 32 that decrypts the encrypted copy 38 of the particular file 30. As a result, the process for erasing the encrypted copy 38 of a particular file 30 is relatively quick and simple, i.e., use of "per-file" salt parameters 36 enable deletion of an individual file simply by deleting the corresponding per-file salt parameter 36.

It should be further understood that, in some arrangements, users do not need to be burdened with remembering the user input parameters 34 (e.g., user passwords). In these arrangements, a client device 22 creates and manages a user specific (or master encryption) key 50 on behalf of a user. For example, during initial setup of the client device 22 (i.e., an initialization phase), the user can enter a user password as the user input parameter 34, and the client device 22 can derive the user specific key 50 from the user password. With the user specific key 50 now available, the client device 22 creates the file encryption keys 32 based on the user specific key 50 and the per-file salt parameters 36. Since the user specific key 50 is derived from the user password, the file encryption keys 32 are still based on the user input parameter 34 although indirectly. Here, the client device 22 stores both the salt parameters 36 and the user specific key 50 in the storage system 24 in an "escrow" manner for safekeeping. Accordingly, the file encryption keys 32 can be recreated from the salt parameters 36 and the user specific key 50 stored on the storage system 24, and users are not forced to remember the user input parameter 34. Since the storage system 24 stores the user specific key 50 rather than the user input parameter 34, the user does not need to provide an actual user password to the storage system 24 for retrieving any file encryption keys 32 (although a password may still be required during authentication with the storage system 24). Moreover, even if the user (or the client device 22) looses the user password, the salt parameters 36 and the user specific key 50 stored on the storage system 24 provide the ability to recreate the file encryption keys 32 to recover the data.

When the store system 24 needs to erase an electronic copy 38 of a particular file 30 in the above-described "escrow" arrangements, the storage system 24 simply deletes the salt parameter 36 corresponding to the electronic copy 38 of that particular file 30. As a result, the ability to recreate the file encryption key 32 is effectively removed and access to the data within the electronic copy 38 of the particular file 30 is lost.

It should be understood that, in some arrangements, the file encryption keys 32 comply with the Advanced Encryption Standard (AES), i.e., the file encryption keys 32 are AES keys. In particular, in some arrangements, the file encryption keys 32 are AES compliant with Cipher Block Chaining (CBC).

Additionally, it should be understood that the number of bits for the salt parameter 36 can be varied depending on the level of desired security. For example, 32-bits may be sufficient if an attacker does not know the user password (i.e., the user input parameter 34). However, to protect against the possibility of an attacker with knowledge of the user password, the number of bits for the salt parameter 36 may be increased, e.g., to 128 bits or more. Further details will now be provided with reference to FIG. 2.

Figure 2:
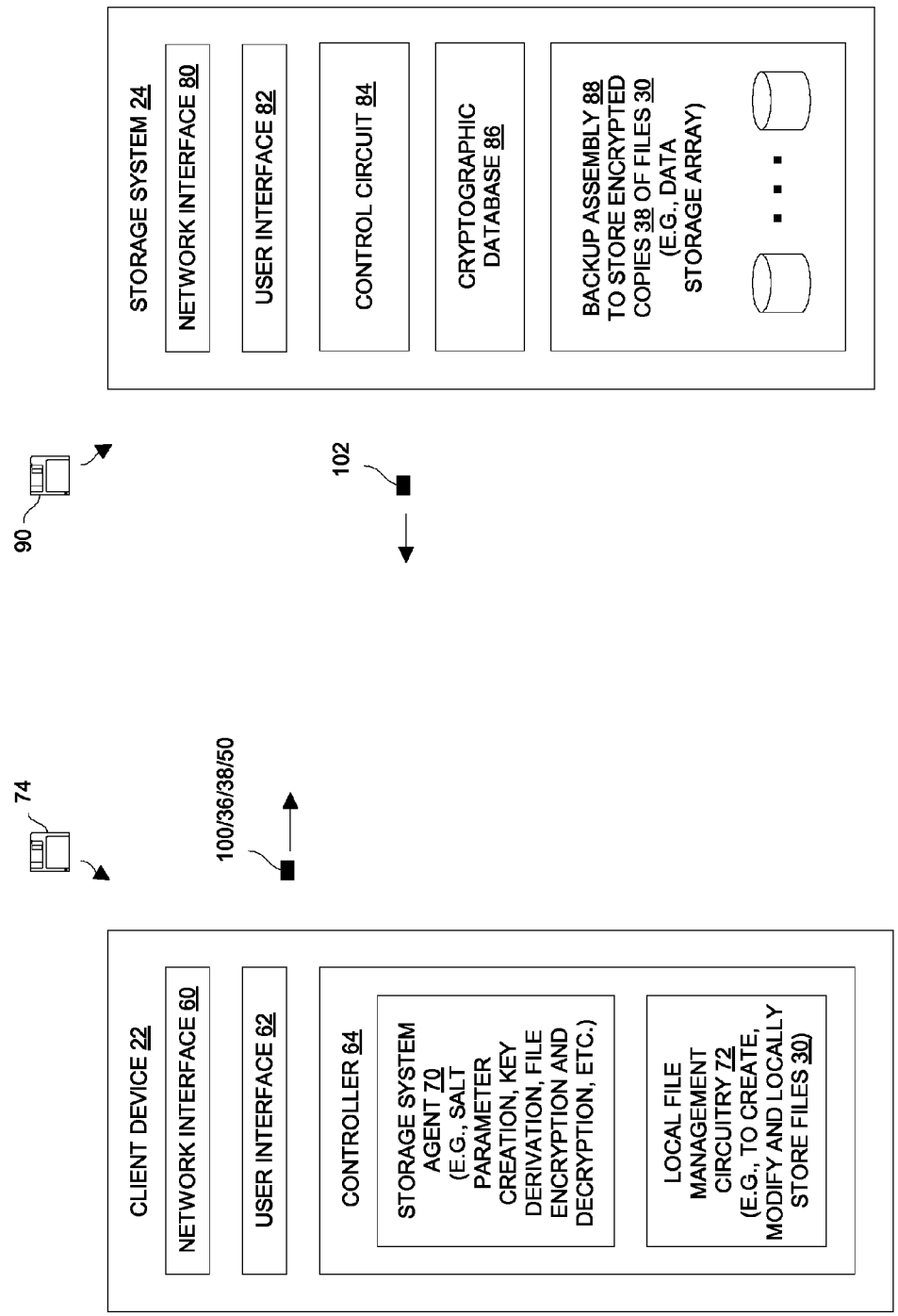
FIG. 2 is a block diagram showing particular details of a client device and a storage system of the electronic environment of FIG. 1.

FIG. 2 shows particular details of a client device 22 and the storage system 24 in the context of a backup system which backs up encrypted copies 38 of files 30 from the client device 22. The client device 22 includes a network interface 60, a user interface 62 and a controller 64.

The network interface 60 of the client device 22 is constructed and arranged to connect to the communications medium 26 (FIG. 1) and thus communicate with other devices of the electronic environment 20. In some arrangements, the network interface 60 is implemented in the form of a network card or a network adapter module.

The user interface 62 of the client device 22 is constructed and arranged to receive input from a user and provides output to the user. To this end, the user interface 62 includes a keyboard, a mouse, a display, and hardware/physical ports for other types of user communications (e.g., magnetic I/O, optical I/O, wireless I/O, etc.).

The controller 64 includes a storage system agent 70 and local file management circuitry 72. The storage system agent 70 performs various client-side related operations thus coordinating activities with the storage system 24 (e.g., creating file encryption keys 32, backing up encrypted copies 38 of the files 30 to the storage system 24 through the communications medium 26, and so on). The local file management circuitry 72 performs a variety of operations such as creating, modifying and locally storing the files 30 thus enabling the user to accomplish work (e.g., edit electronic documents, update electronic databases, send/receive email, etc.).

The controller 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 74 is capable of delivering all or portions of the software to the client device 22. The computer program product 74 has a non-transitory (or non-volatile) computer readable medium which stores a set of instructions which controls one or more operations of the controller 64. Examples of suitable computer readable storage media include tangible articles of manufacture and apparatus which store instructions in a non-volatile manner such as CD-ROM, flash memory, disk memory, tape memory, and the like.

The storage system 24 includes a network interface 80, a user interface 82 and a control circuit 84, cryptographic database 86, and backup assembly 88. The network interface 80 of the storage system 24 connects to the communications medium 26 (FIG. 1) and thus enables the storage system 24 to communicate with other devices of the electronic environment 20. In some arrangements, the network interface 80 is implemented in the form of a network card or a network adapter module.

The user interface 82 of the storage system 24 receives input from a user (e.g., an administrator who configures and manages the storage system 24) and provides output to the user. To this end, the user interface 82 includes a keyboard, a mouse, a display, and hardware/physical ports for other types of user communications (e.g., magnetic I/O, optical I/O, wireless I/O, etc.).

The control circuit 84 of the storage system 24 performs various server-side related operations on behalf of the client devices 22 (also see FIG. 1). For example, the control circuit 84 accesses the cryptographic database 86 to store and delete information from the storage system agents 70 of the client devices 22. As another example, the control circuit 84 stores encrypted copies 38 of files 30 within, and retrieves the encrypted copies 38 of the file 30 from the backup assembly 88 on behalf of the client devices 22. In some arrangements, the backup assembly 88 includes one or more data storage arrays (e.g., arrays of storage devices, etc.).

The control circuit 84 can be implemented in a variety of ways including via one or more processors running specialized software, ASICs, FPGAs and associated programs, discrete components, analog circuits, other hardware circuitry, combinations thereof, etc. In the context of one or more processors running specialized software, a computer program product 90 is capable of delivering all or portions of the software to the storage system 24. The computer program product 90 has a non-transitory computer readable medium which stores a set of instructions which controls one or more operations of the control circuit 84. Examples of suitable computer readable storage media include tangible articles of manufacture and apparatus which store instructions in a non-volatile manner such as CD-ROM, flash memory, disk memory, tape memory, etc.

During operation, encryption occurs on the client-side. That is, suppose that the user of the client device 22 creates a new file 30. To backup the new file 30 (e.g., manually, at a scheduled backup time, etc.), the storage system agent 70 creates a file encryption key 32 from a user input parameter 34 and a salt parameter 36. The user input parameter 34 may be the user's password and the salt parameter 36 may be a random number which is generated locally by the client device 22 thus locating all key derivation activity on the client device 22.

Once the storage system agent 70 creates the file encryption key 32, the storage system agent 70 uses the file encryption key 32 to encrypt the file 30. In particular, the storage system agent 70 creates an encrypted copy 38 of the file 30. The storage system agent 70 then sends a storage command 100, the salt parameter 36 and the encrypted copy 38 of the file 30 to the storage system 24 through the communications medium 26. The storage command 100 includes certain identifying information that identifies the client device 22 and storage details (e.g., storage duration, owner information, file pathname information, etc.).

Upon receipt of the storage command 100, the salt parameter 36 and the encrypted copy 38 of the file 30, the control circuit 84 processes the storage command 100. In particular, the control circuit 84 creates an entry in the cryptographic database 86 to store the salt parameter 36 and saves the encrypted copy 38 of the file 30 in the backup assembly 88.

Once the control circuit 84 has finished processing the storage command 100, the control circuit 84 sends an acknowledgement message 102 to the client device 22 through the communications medium 26. The acknowledgement message 102 informs the storage system agent 70 that the storage system 24 safely stores the salt parameter 36 and the encrypted copy 38 of the file 30. Accordingly, the client device 22 is now able to perform other operations such as recreate the file encryption key 32 from the stored salt parameter 36 and decrypt the encrypted copy 38 of the file 30, erase the encrypted copy 38 of the file 30 from the storage system 24, and so on.

Figure 3:
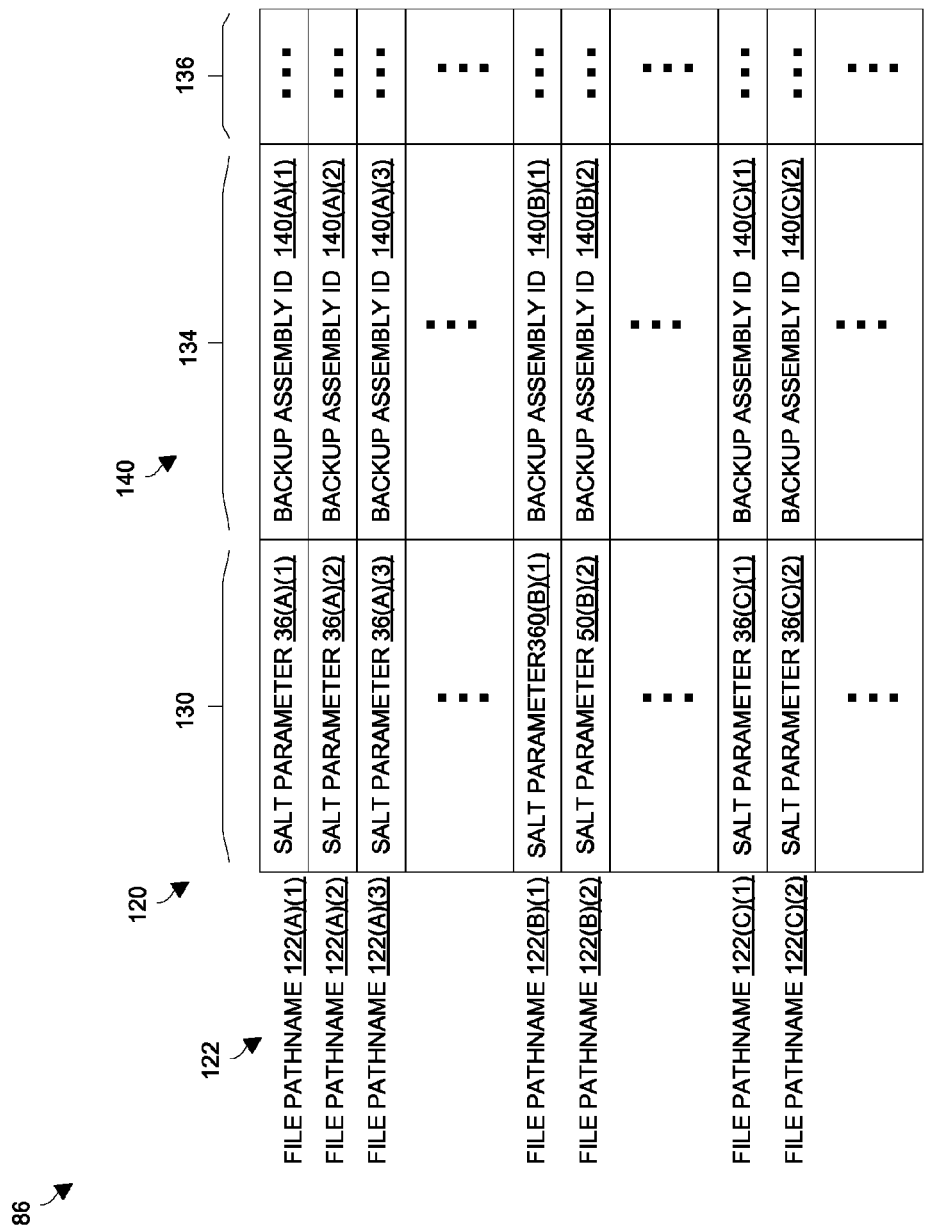
FIG. 3 is a block diagram of a cryptographic database of the storage system of FIGS. 1 and 2.

FIG. 3 shows particular details of the cryptographic database 86 of the storage system 24. The cryptographic database 86 includes database entries 120 containing various information (i.e., rows within the database 86). Each database entry 120 (or row) is referenced (or indexed) by a file pathname 122 (e.g., a combination of a particular client device 22 name, a particular path, and a particular filename) to uniquely identify (or correspond to) the backed up encrypted copy 38 of a particular file 30. By way of example only, the cryptographic database 86 includes at least three entries 120 for the client device 22(A) (FIG. 1) which are indexed by file pathnames 122(A)(1), 122(A)(2) and 122(A)(3). Similarly, the cryptographic database 86 includes at least two entries 120 for the client device 22(B) which are indexed by file pathnames 122(B)(1) and 122(B)(2), and at least two entries 120 for the client device 22(C) which are indexed by file pathnames 122(C)(1) and 122(C)(2), and so on.

Each entry 120 includes a salt parameter field 130, a backup assembly identifier field 134, and other fields 136. The salt parameter field 130 of each entry 120 stores the salt parameter 36 used to derive the file encryption key 32 that encrypted the file 30 corresponding to that entry 120. The backup assembly identifier field 134 of each entry 120 stores, as a backup assembly identifier 140, the location of the backed up encrypted copy 38 of the file 30 corresponding to that entry 120. The other fields 136 store additional information such as how long the encrypted copy 38 of the file 30 is to scheduled remain in the storage system 24, etc.

At this point, it should be understood that the control circuit 84 adds an entry 120 when a client device 22 backs up an encrypted copy 38 of a new file 30. Furthermore, the control circuit 84 is capable of performing delete operations in response to delete commands to prevent access to the backed up encrypted copy 38 of the file 30. To this end, the control circuit 84 simply erases the salt parameter 36 of an entry 120 in order to delete the backed up encrypted copy 38 of the file 30. That is, once the contents of the salt parameter field 130 of that entry 120 are erased, the file encryption key 32 to decrypt the backed up encrypted copy 38 of the file 30 cannot be recreated. As a result, the backed up encrypted copy 38 of the file 30 is effectively deleted.

Recall that, in some escrow mode arrangements, the storage system 24 not only stores the salt parameters 36 but also stores a user specific key 50 which is derived from a user password to enable file encryption key recreation even if the user forget the user password. In such arrangements, the controller 64 of the control device 22 sends the user specific key 50 to the storage system 24 when a user account is created. The user specific key 50 is a unique master encryption key for the user that is stored on the storage system 24 and is used together with salt parameters 36 to generate file encryption keys 32.

Figure 4:
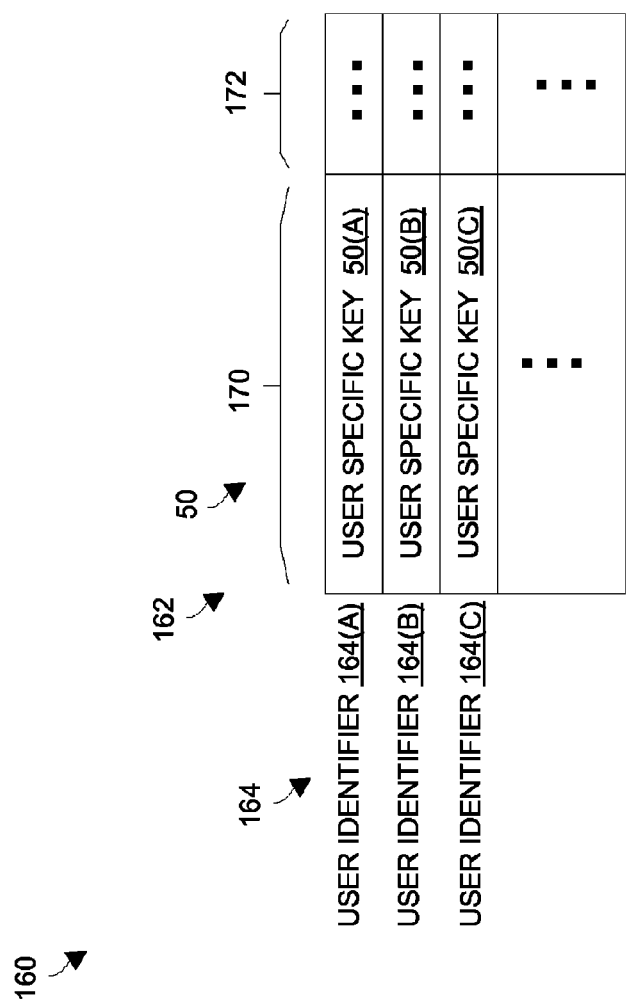
FIG. 4 is a block diagram of a user database of the storage system of FIGS. 1 and 2.

FIG. 4 shows particular details of a user database 160 which is maintained by the storage system 24. The user database 160 may be part of the control circuit 84 or part of the cryptographic database 86 (also see FIG. 2). The user database 160 includes database entries 162 (i.e., rows within the database 160) containing various user information. Each database entry 162 (or row) is referenced (or indexed) by a user identifier 164 which uniquely identifies a user among other users.

Each entry 162 includes a user specific key field 170, and other fields 172. The user specific key field 170 of each entry 162 stores the user specific key 50 on behalf of the user identified by the user identifier 164 for that entry 162. The other fields 172 store additional user information such as user account details, addresses of client devices 22 of the user which are authorized to receive salt parameters 36, overall backup storage consumed, authorized storage capacity, etc.

During escrow mode operation, if a user needs to restore data from an encrypted copy 38 of a file 30, the storage system 24 is able to provide the appropriate user specific key 50 from the user database 160 and the appropriate salt parameter 36 from the cryptographic database 86 to enable recreation of the file encryption key 32 for decryption of the encrypted copy 38 of the file 30. Accordingly, the user is able to access the data without even if the user does not remember the user's password, i.e., the user input parameter 34. Moreover, such recovery of data occurs without the user sharing the user input parameter 34 with the storage system 24

It should be understood that, when the user closes his account with the storage system 24, the storage system 24 erases the user specific key 50. This operation causes the deletion of all user files within the storage system 24. It should be further understood that in secure mode arrangements in which users maintain responsibility for their user passwords, there are no user specific keys 50 provided from the client devices 22 to the storage system 24. Accordingly, the storage system 24 may maintain a user database similar to that shown in FIG. 4. However, in these secure mode arrangements, the user specific key field 170 does not exist.

Figure 5:
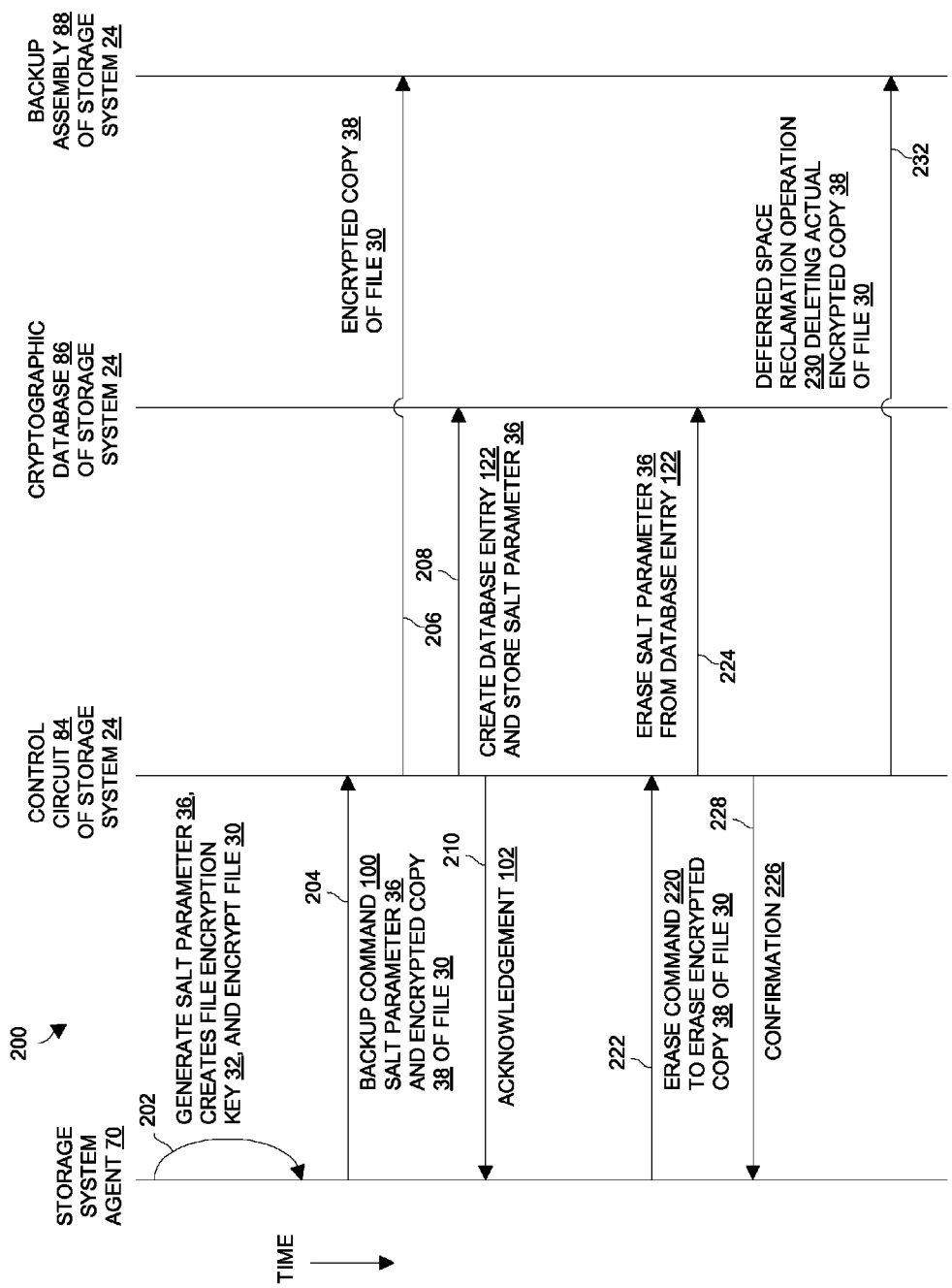
FIG. 5 is a sequence diagram showing particular activity involved in controlling access to an encrypted file.
Figure 6:
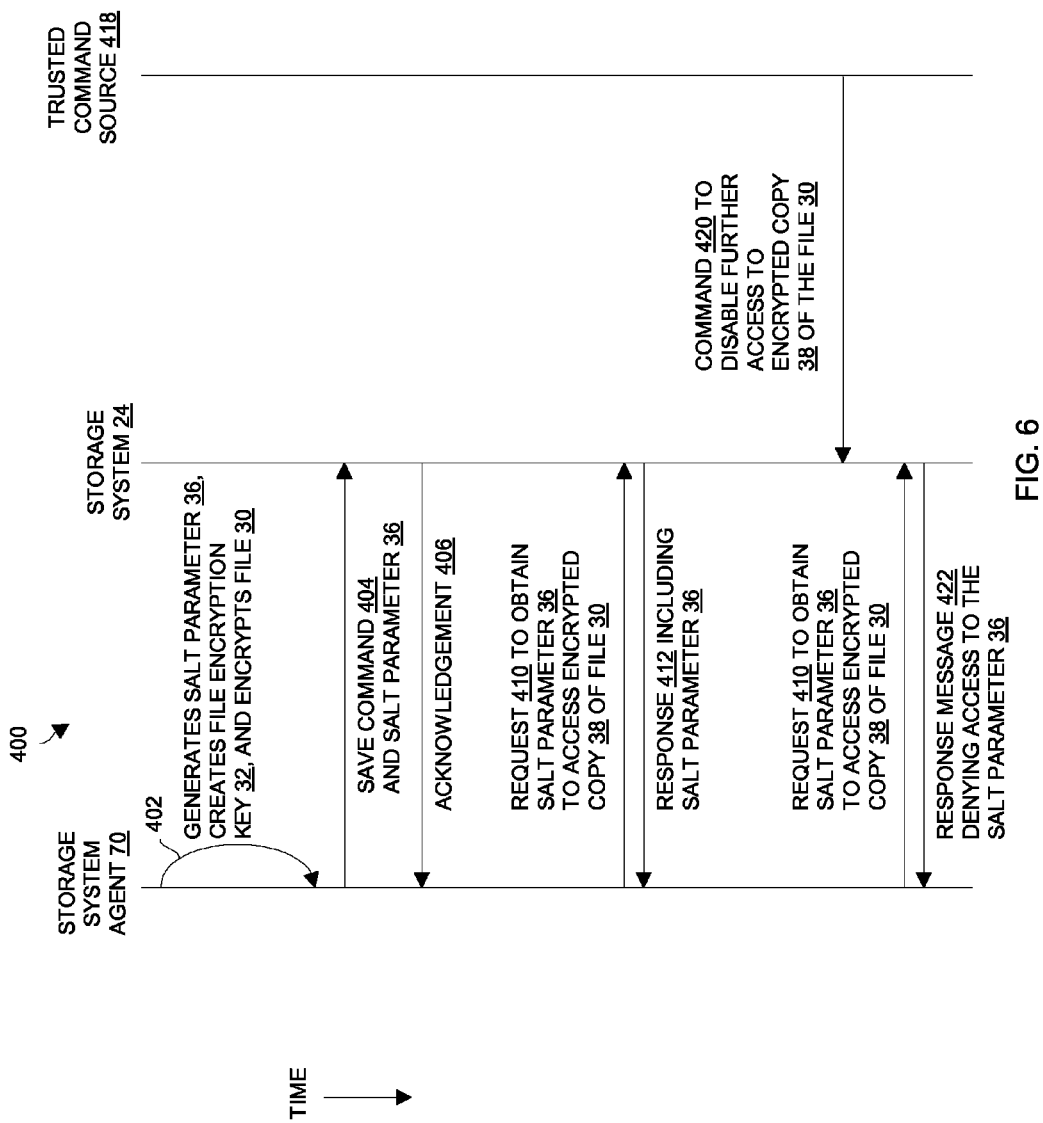
FIG. 6 is a sequence diagram showing particular activity involved in controlling access to an encrypted file on a portable electronic device of the electronic environment of FIG. 1.

Further details will now be provided with reference to FIGS. 5 and 6. FIG. 5 shows a sequence diagram 200 which includes particular activity between a client device 22 and the storage system 24 when the storage system 24 operates as a backup facility for the client device 22. FIG. 6 shows a sequence diagram 400 for an arrangement in which the features of the storage system 24 which are involved in managing salt parameters 36 are employed to control access to encrypted copies 38 of files 30 which are stored on a client device 22 such as a laptop computer.

With reference to FIG. 5 in which the storage system 24 operates as a backup facility, sequence diagram 200 describes certain interactions among various components of the electronic environment 20. Along these lines, the sequence diagram 200 starts with the user of the client device 22 has saved the file 30 locally, and the storage system agent 70 receiving an instruction to backup the file 30 to the storage system 24. For example, the user may have provided a backup instruction to the storage system agent 70 to backup the file 30, the storage system agent 70 may have responded to a scheduled instruction to perform a routine backup operation which includes backing up the file 30, etc.

At this point (see arrow 202), the storage system agent 70 receives a user input parameter 34 (i.e., a user password), generates a salt parameter 36 (e.g., a random number), and creates a file encryption key 32 based on the user input parameter 34 and the salt parameter 36. For secure mode, a formula which is suitable for this operation is represented by Equation (1) below:

$$\text{file encryption key} = f(\text{user input parameter}, \text{salt parameter}, \text{file pathname}) \quad (1).$$

The function f( ) may be a symmetric key generation function such as PKCS#5 PBKDF2, or perhaps a hash or a portion of the output of such functions such as SHA-512, and so on. Equation (1) shows the function f( ) as having the ability to include additional parameters such as a file pathname in order to bind the file encryption key 32 to a file 30. Such operation provides a 1-to-1 correspondence between file encryption keys 32 and files 30. Moreover, with each file encryption key 32 using a different salt parameter 36, there is also a 1-to-1 correspondence between files 30 and salt parameters 36 (i.e., "per-file" salt). With the file encryption key 32 now created and available for use, the client device 22 generates an encrypted copy 38 of the file 30.

For escrow mode operation, a user specific key 50 is used to create file encryption keys 32. As explained earlier with reference to FIG. 4, the user specific key 50 is derived from the user input parameter 34 (e.g., a user password) at initialization time, and is stored by the storage system 24 in a user database 160. A formula which is suitable for derivation of the user specific key 50 is represented by Equation (2) below:

$$\text{user specific key} = f(\text{user input parameter}) \quad (2),$$

where the function f( ) may be a symmetric key generation function such as PKCS#5 PBKDF2, or perhaps a hash or a portion of the output of such functions, e.g., SHA-512. This user specific key 50 may be referred to as a master encryption key in that it may be used as a user input parameter 34 for encryption of multiple files 30.

When the storage system agent 70 creates a file encryption key 32 based on the user specific key 50 and the salt parameter 36. A formula which is suitable for this operation is represented by Equation (3) below:

$$\text{file encryption key} = f(\text{user specific key}, \text{salt parameter}, \text{file pathname}) \quad (3).$$

The function f( ) may be a symmetric key generation function such as PKCS#5 PBKDF2, or perhaps a hash or a portion of the output of such a function, e.g., SHA-512. Equation (3) shows the function f( ) as having the ability to include additional parameters such as a file pathname in order to bind the file encryption key 32 to a file 30. Such operation provides a 1-to-1 correspondence between file encryption keys 32 and files 30. With the file encryption key 32 now created and available for use, the client device 22 generates an encrypted copy 38 of the file 30.

Subsequently (for either secure mode or escrow mode), the storage system agent 70 sends a backup command 100 (also see FIG. 2), the salt parameter 36 and the encrypted copy 38 of the file 30 to the storage system 24 (arrow 204 in FIG. 5). The control circuit 84 of the storage system 24 then processes the backup command 100. In particular, the control circuit 84 saves the encrypted copy 38 of the file 30 in the backup assembly 88 (arrow 206). Additionally, the control circuit 84 creates a database entry 122 in the cryptographic database 80 and stores the salt parameter 36, the user specific key 50, and the backup assembly location of the encrypted copy 38 in that entry 122 (arrow 208, also see FIG. 3). The control circuit 84 then sends an acknowledgement 102 to the storage system agent 70 (arrow 210).

Later, if the user decides to erase the encrypted copy 38 of the file 30 from the storage system 24, the user directs the storage system agent 70 to send an erase command 320 to the storage system 24 (arrow 222). Upon receipt of the erase command 222 from the storage system agent 70, the control circuit 84 of the storage system 24 deletes the salt parameter 36 from the database entry 122 in the cryptographic database 84 (arrow 224), and then sends confirmation 226 back to the storage system agent 70 (arrow 228). Such operation may simply involve overwriting or deleting the contents of the salt parameter field 130 of the database entry 122 (FIG. 3). Such operation is simple and provides quick response time. Furthermore, such operation works well and does not interfere with any space reclamation operation 230 which can be performed by the control circuit 84 conveniently perhaps at a later time in order to recapture storage space in the backup assembly 88 (arrow 232).

FIG. 6 is a sequence diagram 400 showing particular activity involved in controlling access to an encrypted copy 38 of a file 30 on a client device 22 such as a portable laptop computer. In these arrangements, it should be understood that all files remain in encrypted form on the client device 22 for added security (i.e., enhanced control over access to the data within the files).

In these arrangements, when the user of the client device 22 is ready to save a file 30 locally, the storage system agent 70 receives a user input parameter 34 generates a salt parameter 36 (e.g., a random number), and creates a file encryption key 32 based on the user input parameter 34 and the salt parameter 36. When secure mode is employed, a suitable formula for creating the file encryption key 32 is Equation (1) in which the storage system agent 70 directly includes the user input parameter 34. Alternatively, when escrow mode is employed, a suitable formula is Equation (3) in which the storage system agent 70 indirectly includes the user input parameter 34 by using the user specific key 50 as a parameter. Using the file encryption key 32, the client device 22 encrypts and locally stores the encrypted copy 38 of the file 30 (or simply the file 30 in encrypted form). This activity is illustrated as arrow 402 in FIG. 6.

Next, the storage system agent 70 sends a save command 404, and the salt parameter 36 to the storage system 24. The storage system 24 saves the salt parameter 36 (e.g., see the cryptographic database 86 in FIG. 3) and sends an acknowledgement 406 to the storage system agent 70.

Later, when the user wishes to access the encrypted copy 38 of the file 30 on the client device 22, the user directs the storage system agent 70 to send a request 410 to obtain the salt parameter 36 from the storage system 24. In response to the request 410, the storage system 24 provides a response 412 having the salt parameter 36 to the storage system agent 70. The storage system agent 70 is then able to recreate the file encryption key 32 and access the data within the encrypted copy 38 of the file 30.

At some point, the user may lose possession of the client device 22. For example, the client device 22 may become lost or stolen. In these situations, the user obtains access to a trusted command source 418 (a new client device 22) and provides a command 420 from the trusted command source 418 to the storage system 24 to disable further access to the encrypted copy 38 of the file 30 (e.g., perhaps from the user's new laptop or some other trusted command source). After the storage system 24 receives the command 420, the storage system 24 denies further requests for the salt parameter 36 from the client device 22. In particular, as shown at the bottom of FIG. 6, if the client device 22 provides another request to obtain the salt parameter 36 after the storage system 24 has received the command 420, the storage system 24 provides a response message 422 denying access to the salt parameter 36. Accordingly, the data within the encrypted copy 38 of the file 30 remains secure. Although the client device 22 generated the salt parameter 36, one should appreciate that the storage system 24 essentially operates as a salt parameter server to then provide salt parameter storage and retrieval services to the client device 22.

As mentioned above, improved techniques are directed to controlling access to files 30 using salt parameters 36. Such techniques involve creating file encryption keys 32 based on user input parameters 34 (e.g., user passwords) and the salt parameters 36 (e.g., random numbers), and generating encrypted copies 38 of the files 30 using the file encryption keys 32. Accordingly, access to data within the encrypted copies 38 of the files 30 requires the file encryption keys 32 and thus further requires the salt parameter 36 to create the file encryption keys 32.

While various embodiments of the invention have been particularly shown and described, it will be understood by those skilled in the art that various changes in form and details may be made therein without departing from the spirit and scope of the invention as defined by the appended claims.

For example, it should be understood that some backup systems store subsequent versions of files as binary patches (i.e., changed blocks or portions). For these backup systems, the same salt parameter management techniques can be applied to enable deletion of specific versions in response to version deletion commands. For example, suppose that an encrypted copy 38 of a file 30 and its respective salt parameter 36 are already stored in the storage system 24. When the user creates new versions of the file 30 (e.g., by editing the file 30), the client device 22 generates new salt parameters 36 and encrypts the binary patches of the file 30 with file encryption keys 32 based on the new salt parameters 36. The client device 22 backs up these new salt parameters 36 and the encrypted binary patches of the file 30 in the storage system 24. Accordingly, there is a 1-to-1 correspondence between file versions and file encryption keys 32, as well as a 1-to-1 correspondence between file versions and salt parameters 36 (i.e., "per-version" salt). To erase a later version, the user sends a version deletion command to the storage system 24 and the storage system 24 simply deletes the appropriate salt parameter 36 (i.e., deletes a per-version salt).

Moreover, the storage system 24 is able to erase middle versions in a similar manner (i.e., by simply deleting salt parameters 36). Along these lines, before the salt parameters 36 are deleted, the client device 22 (or alternatively the storage system 24) decrypts any binary patches that are needed for later versions that are to remain backed up in the storage system 24. The client device 22 (or the storage system 24) then re-encrypts the binary patches for the later versions using the salt parameters 36 corresponding to the later versions. At this point, the storage system 24 can delete the salt parameters 36 corresponding to the middle versions without deleting the actual binary patches. Going forward, the file encryption keys 32 for earlier and later versions are re-creatable from the remaining salt parameters 36.

Additionally, it should be understood that the above-described techniques can be applied to folders since folders (or subdirectories) are typically treated as files 30 by many computerized devices. Along these lines, the storage system 24 is constructed and arranged to store encrypted folders, and the client devices 22 use file encryption keys 32 to encrypt the folders before sending the encrypted folders to the storage system 24. Here, to delete a folder and all of its file contents, the user provides an erase command to delete a folder. In response, the storage system 24 either (i) recursively deletes the folder or (ii) deletes the folder in exactly one salt parameter deletion operation, without having to iterate over each file contained in the folder. Accordingly, there is a 1-to-1 correspondence between folders and file encryption keys 32, as well as a 1-to-1 correspondence between folders and salt parameters 36 (i.e., "per-folder" salt).

Furthermore, it should be understood that all files 30 which are encrypted by file encryption keys 32 derived from the same user specific key 50 can be deleted by simply erasing the user specific key 50 from the storage system 24. Recall that in escrow mode, the client device 22 derives the user specific key 50 from that user password and creates all of the encryption keys 32 from that user specific key 50. The client device 22 then stores (or "escrows") the user specific key 50 in the storage system 24 (see the user database 160 in FIG. 4). Accordingly, removal of the user specific key 50 from the storage system 24 effectively results in deletion of all files (i.e., account cancellation).

Additionally, it should be understood that the secure mode of operation (e.g., see FIG. 4) was described above as deriving file encryption keys 32 directly from user passwords (e.g., see Equation (1)). It should be understood that the secure mode of operation may derive file encryption keys 32 indirectly from user passwords via a user specific key 50 (e.g., see Equation (2)).

Furthermore, other key derivation operations and approaches can be combined with those described above to enhance and augment the operation of the electronic environment 20. Such modifications and enhancements are intended to belong to various embodiments of the invention.

What is claimed is:

1. A method of controlling access to a file, of controlling access to a file, the method comprising:
   creating a file encryption key based on (i) a user input parameter from a user of the client device and (ii) an automatically generated salt parameter;
   encrypting the file using the file encryption key to form an encrypted copy of the file; and
   providing the salt parameter to an external storage system to externally store the salt parameter, access to data within the encrypted copy of the file requiring the salt parameter provided to the external storage system;
   wherein the external storage system includes a remote backup assembly which performs backup operations on behalf of multiple client devices; and wherein the method further comprises:
      while the file resides locally in the client device, sending the encrypted copy of the file to the remote backup assembly to backup the file in the remote backup assembly;
   wherein the salt parameter is a random number which is locally generated by the client device;
   wherein creating the file encryption key includes deriving the file encryption key based on the user input parameter and the random number;
   wherein the user input parameter is a user password obtained from the user of the client device;
   wherein the file encryption key is created from the user password and the random number; and
   wherein providing the salt parameter to the external storage system includes sending the salt parameter to the external storage system while withholding the user password from the external storage system in a secure mode which imposes responsibility to manage the user password on the user of the client device to decrypt the encrypted copy of the file.

2. A method as in claim 1, further comprising:
   sending an erase command to the external storage system, the erase command directing the external storage system to delete the salt parameter to prevent access to the data within the encrypted copy of the file.

3. A method as in claim 1 wherein the external storage system further includes a salt parameter database;
   wherein entries of the salt parameter database store salt parameters corresponding to files backed up in the remote backup assembly;
   wherein the entries of the salt parameter database are indexed by file pathnames corresponding to the files backed up in the remote backup assembly; and
   wherein providing the salt parameter to the external storage system to externally store the salt parameter includes sending, to the external storage system, a file pathname describing where the file resides locally in the client device to enable the external storage system to create a new entry in the salt parameter database which uses the file pathname as an index to the new entry.

4. A method as in claim 1, further comprising:
   creating other file encryption keys based on (i) the user input parameter from the user of the client device and (ii) other automatically generated salt parameters;
   encrypting changed portions of the file using the other file encryption keys to form encrypted copies of the changed portions of the file, the changed portions of the file corresponding to a set of later versions of the file; and
   providing the other salt parameters to the external storage system to externally store the other salt parameters, access to data within the encrypted copies of the changed portion of the file requiring the other salt parameters provided to the external storage system.

5. A method as in claim 4, further comprising:
   sending an erase command to the external storage system, the erase command directing the external storage system to delete one of the other salt parameters provided to the external storage system to prevent access to a later version of the file.

6. A method as in claim 1 wherein the file resides locally within a folder in the client device; and wherein the method further comprises:
   creating a folder encryption key based on (i) the user input parameter from the user of the client device and (ii) another automatically generated salt parameter;
   encrypting the folder using the folder encryption key to form an encrypted copy of the folder; and
   providing the other salt parameter to the external storage system to externally store the salt parameter, access to the encrypted copy of the folder requiring the other salt parameter provided to the external storage system.

7. A method as in claim 6, further comprising:
   sending an erase command to the external storage system, the erase command directing the external storage system to delete the other salt parameter provided to the external storage system to simultaneously prevent access to the folder and the file.

8. A method as in claim 1, further comprising:
   obtaining the salt parameter and the encrypted copy of the file from the external storage system;
   recreating the file encryption key based on the user input parameter and the salt parameter; and
   decrypting the encrypted copy of the file from the external storage system using the recreated file encryption key to restore the file on the client device.

9. A method as in claim 1 wherein the client device is a portable computerized device which locally stores another encrypted copy of the file; and wherein the method further comprises:

obtaining the salt parameter from the external storage system; and decrypting the other encrypted copy of the file locally stored on the portable computerized device to provide the user with access to data of the file.

10. A method as in claim 1,
wherein the external storage system is remote from the client device, a connection between the client device and the external storage system being created over a public network connection; and
wherein providing the salt parameter to the external storage system includes:
sending the salt parameter to the external storage system over the public network connection.

11. A method as in claim 10,
wherein the client device includes a local storage device; and
wherein sending the salt parameter to the external storage system over the network connection includes:
transmitting the salt parameter over the network connection without the file encryption key, the file encryption key being retained in the client device; and
storing the file encryption key in the local storage device.

12. A client device, comprising:
a network interface;
a user interface; and
a controller coupled to the network interface and the user interface, the controller being constructed and arranged to:
create a file encryption key based on (i) a user input parameter received from a user through the user interface and (ii) an automatically generated salt parameter,
encrypt the file using the file encryption key to form an encrypted copy of the file, and
provide the salt parameter to an external storage system through the network interface to externally store the salt parameter, access to data within the encrypted copy of the file requiring the salt parameter provided to the external storage system;
wherein the external storage system includes a remote backup assembly which performs backup operations on behalf of multiple client devices; and wherein the controller is further constructed and arranged to:
while the file resides locally in the client device, send the encrypted copy of the file to the remote backup assembly through the network interface to backup the file in the remote backup assembly;
wherein the salt parameter is a random number which is locally generated by the client device;
wherein creating the file encryption key includes deriving the file encryption key based on the user input parameter and the random number;
wherein the user input parameter is a user password obtained from the user of the client device;
wherein the file encryption key is created from the user password and the random number; and
wherein providing the salt parameter to the external storage system includes sending the salt parameter to the external storage system while withholding the user password from the external storage system in a secure mode which imposes responsibility to manage the user password on the user of the client device to decrypt the encrypted copy of the file.

13. A computer program product having a non-transitory computer readable medium which stores a set of instructions that, when performed by a computerized device, cause the computerized device to:
create a file encryption key based on (i) a user input parameter from a user of the computerized device and (ii) an automatically generated salt parameter;
encrypt the file using the file encryption key to form an encrypted copy of the file; and
provide the salt parameter to an external storage system to externally store the salt parameter, access to data within the encrypted copy of the file requiring the salt parameter provided to the external storage system;
wherein the external storage system includes a remote backup assembly which performs backup operations on behalf of multiple client devices; and wherein set of instructions further causes the computerized device to:
while the file resides locally in the client device, send the encrypted copy of the file to the remote backup assembly through the network interface to backup the file in the remote backup assembly;
wherein the salt parameter is a random number which is locally generated by the client device;
wherein creating the file encryption key includes deriving the file encryption key based on the user input parameter and the random number;
wherein the user input parameter is a user password obtained from the user of the client device;
wherein the file encryption key is created from the user password and the random number; and
wherein providing the salt parameter to the external storage system includes sending the salt parameter to the external storage system while withholding the user password from the external storage system in a secure mode which imposes responsibility to manage the user password on the user of the client device to decrypt the encrypted copy of the file.

14. In a storage system, a method of controlling access to a file, the method comprising:
after an external client device creates a file encryption key based on (i) a user input parameter from a user of the external client device and (ii) an automatically generated salt parameter and after the external client device encrypts the file using the file encryption key to form an encrypted copy of the file, obtaining the salt parameter from the external client device, access to data within the encrypted copy of the file requiring the salt parameter;
storing the salt parameter within the storage system; and
providing a response message to the external client device informing the external client device that the salt parameter is stored within the storage system;
wherein the storage system includes a backup assembly which performs backup operations on behalf of multiple client devices, and wherein the method further comprises:
while the file resides locally in the external client device, receiving the encrypted copy of the file, and
storing the encrypted copy of the file in the backup assembly;
wherein the salt parameter is a random number which is locally generated by the external client device;
wherein, when the external client device creates the file encryption key, the external client device derives the file encryption key based on the user input parameter and the random number;
wherein the user input parameter is a user password obtained from the user of the external client device;

wherein the file encryption key is created from the user password and the random number; and wherein obtaining the salt parameter from the external client device includes receiving the salt parameter while the external client device withholds the user password in a secure mode which imposes responsibility to manage the user password on the user of the external client device to decrypt the encrypted copy of the file.

15. A method as in claim 14, further comprising:

receiving an erase command;

in response to the erase command deleting the salt parameter from the storage system while the encrypted copy of the file remains stored in the backup assembly; and providing an acknowledgement message to the external client device informing the external client device that the file has been erased.

\* \* \* \* \*